United States Patent [19]

Lee

[11] Patent Number: 5,416,839
[45] Date of Patent: May 16, 1995

[54] UNIVERSAL BED-RAIL CLIP

[76] Inventor: Robert E. Lee, 5232 S. Riverview Cir., Homosassa, Fla. 34448

[21] Appl. No.: 70,241

[22] Filed: Jun. 2, 1993

[51] Int. Cl.⁶ .................................. H04M 1/00
[52] U.S. Cl. ........................ 379/449; 379/454; 379/455; 379/446
[58] Field of Search ........... 379/455, 449, 446, 426, 379/454; 248/214, 320

[56] References Cited

U.S. PATENT DOCUMENTS

| | | |
|---|---|---|
| D. 284,372 | 6/1986 | Carpenter . |
| 3,889,071 | 6/1975 | Davis et al. . |
| 4,351,505 | 9/1982 | Wickersham . |
| 4,406,928 | 9/1983 | Mackenzie . |
| 4,432,522 | 2/1984 | Pruente et al. . |
| 4,504,992 | 3/1985 | Herron et al. . |
| 4,527,018 | 7/1985 | Offredi . |
| 4,998,277 | 3/1991 | Rioux, Jr. . |
| 5,044,588 | 9/1991 | Gunter ............................ 248/214 |
| 5,169,105 | 12/1992 | Yasukowa . |
| 5,241,592 | 8/1993 | Carlson et al. ................. 379/433 |
| 5,295,649 | 3/1994 | Lee ................................. 379/455 |
| 5,308,253 | 5/1994 | Maki ............................... 248/205.3 |

Primary Examiner—James L. Dwyer
Assistant Examiner—Jack Chiang
Attorney, Agent, or Firm—Parkhurst, Wendel & Rossi

[57] ABSTRACT

A universal bed-rail clip for clipping one of a one-piece telephone and a supporting bracket for such a one-piece telephone onto a horizontal rail of bed-rail assembly, the universal bed-rail clip comprising top and bottom sides being joined together by a joining side and defining, opposite the joining side, an opening for receiving the horizontal rail, the universal bed-rail clip being substantially U-shaped in cross-section, at least one of the top and bottom sides being flexible between open and closed positions, wherein the open position permits passage of the horizontal rail through the opening into an interior of the universal bed-rail clip and fixation means for attaching the universal bed-rail clip to the one of a one-piece telephone and supporting bracket.

11 Claims, 7 Drawing Sheets

UNIVERSAL BED-RAIL CLIP

BACKGROUND OF THE INVENTION

The present invention generally relates to a device for supporting a telephone on a bed-rail of a hospital bed. More particularly, the present invention directed to a novel, universal bed-rail clip for supporting a one-piece telephone or a supporting bracket therefor on a bed-rail assembly of a hospital bed.

Recently, for convenience and comfort of hospital patients, hospitals have provided bedside telephone service. Because of decreased mobility of a bedridden patient, access to a telephone must be convenient. Devices to provide this service should also be sanitary and relatively easy and inexpensive to manufacture. U.S. patent application No. 07/909,757, now is U.S. Pat. No. 5,295,649 the applicant disclosed a telephone support as shown in FIG. 1. The telephone support 1 includes a planer vertical section 2 terminating at top edge 3. Extending substantially perpendicularly from planer vertical section 2 at top edge 3 is lip 4. Angular section 5 extends downwardly and rearwardly from planer vertical section 2. Angular section 5 includes retaining member 6 having inwardly bent ends 7. Retaining member 6 and angular section 5 define an area which receives and supports angular extension 11 of a one-piece telephone 10 (FIG. 2). Longitudinal extension 8 extends forwardly toward a plane defined by planer vertical section 2. Strips 13 shown FIG. 2 may include hook and loop fastening fabric or magnetic tape for attachment to a bed-rail.

As shown in FIG. 3, telephone support i is mounted on upper and lower horizontal rails 15 and 16, respectively, of bed-rail assembly 17 such that planer vertical section 2 abuts an interior surface (facing bed 14) of upper horizontal rail 15.

However, the applicant has discovered that the prior telephone bracket cannot be sufficiently rigidly held onto top rail 15 via hook and loop fastening strips or magnetic tape. For example, through commercial use, it has been determined that hook and loop fastening strips do not provide a necessary secure and rigid attachment to upper horizontal rail 15. This design consideration is particularly important in view of the intended use of the telephone, that is, for bedridden patients who may have limited mobility and coordination.

SUMMARY OF THE INVENTION

It is an objective of the present invention to provide a one-piece telephone supporting device which is adapted to affix rigidly and securely a one-piece telephone to a bed-rail assembly of a hospital bed. Another object of the present invention is to provide such a supporting device readily adapted to or cooperable with pre-existing telephone supports, as discussed above. Advantageously, such a device should be adapted to fit universally all existing bed-rail assemblies, as well as to be sanitary and cost effective to manufacture.

The above objectives are met by a first aspect of the present invention, which provides a universal bed-rail clip for clipping one of a one-piece telephone and a supporting bracket for such a one-piece telephone onto a horizontal rail of bed-rail assembly, the universal bed-rail clip comprising top and bottom sides being joined together by a joining side, the universal bed-rail clip having an open side opposite the joining side for receiving the horizontal rail, the universal bed-rail clip being substantially U-shaped in cross-section, at least one of the top and bottom sides being flexible between open and closed positions, wherein the open position permits passage of the horizontal rail through the open side into an interior of the universal bed-rail clip. A fixation device is provided for attaching the universal bed-rail clip to the one-piece telephone or supporting bracket.

Advantageously, the clip comprises an anti-rotation device such as a protrusion extending from a bottom surface of the clip which is cooperable with a recess of complementary shape in the one-piece telephone or supporting bracket to prevent the clip from rotating relative to the one-piece telephone or supporting bracket.

Preferably, the dimensions of the clip are chosen to fit the various industry standard hospital bed-rails. To achieve this objective, a distance between internal surfaces of the top and bottom sides of the clip is about 0.75 to about 1.0 inches, preferably 0.875 inches, and the top side extends rearwardly a distance of about 1.0 to about 1.5 inches, preferably 1.5 inches. Preferably, the top side includes a rearwardly and downwardly extending arc-shaped portion, terminating as an external edge which partially bounds the open side. This arc-shaped portion further contributes to the universality of the present invention.

A particularly important feature of the present invention is the provision of at least one of the top and bottom sides being flexible between open and closed positions such that the clip is expanded to allow insertion of the bed-rail therethrough. The flexible bed-rail clip returns to a normal configuration (i.e., closed position) after being clipped onto the bed-rail. In this manner, the present bed-rail clip assures a rigid and secure connection with the bed-rail.

A second aspect of the present invention includes a telephone support clip assembly comprising a telephone supporting bracket as described above having the universal bed-rail clip affixed to the top lip thereof. A third aspect of the present invention includes a telephone clip assembly which comprises a one-piece telephone having an angular extension extending downwardly and forwardly at a bottom end thereof, and a universal bed-rail clip affixed to a top surface of the one-piece telephone.

BRIEF DESCRIPTION OF THE DRAWINGS

The description herein makes reference to the accompanying drawings, illustrative of the present invention and not limiting thereto, wherein.

DESCRIPTION OF THE PREFERRED EMBODIMENT

Figure 1:
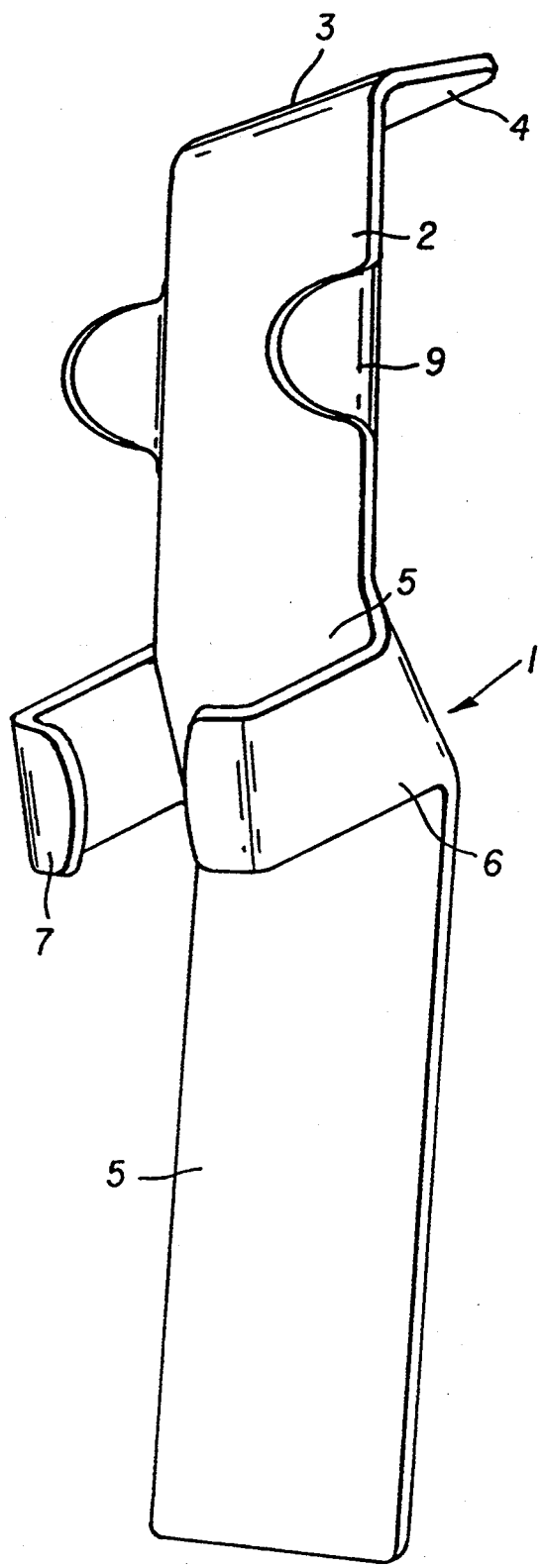
FIG. 1 illustrates a perspective view of the previously disclosed telephone support.
Figure 2:
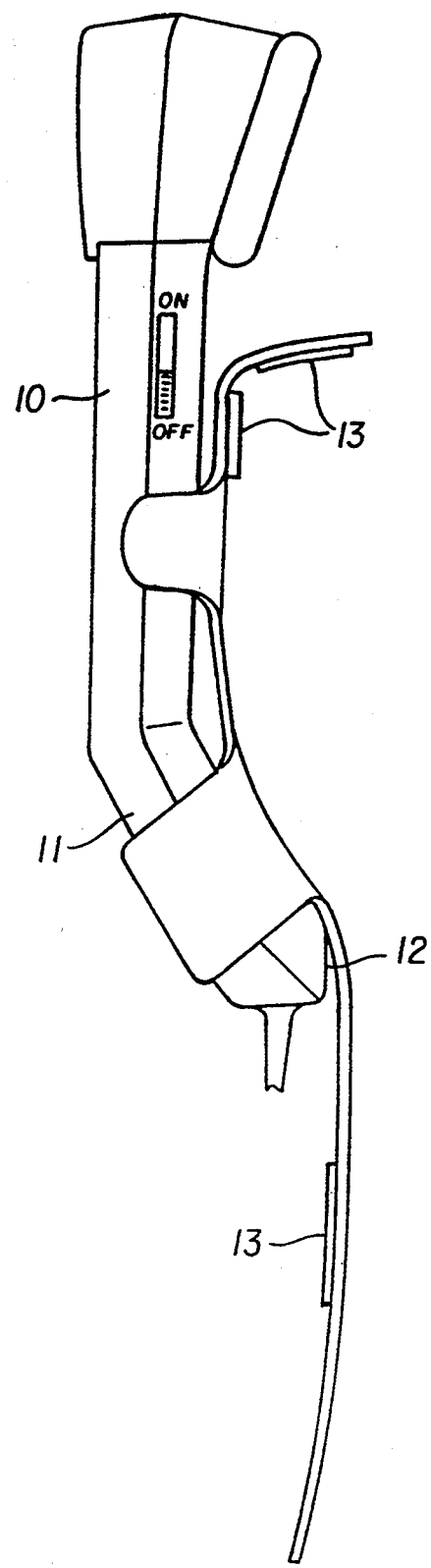
FIG. 2 is side view of the telephone support of FIG. 1, having a one-piece telephone inserted therein.
Figure 3:
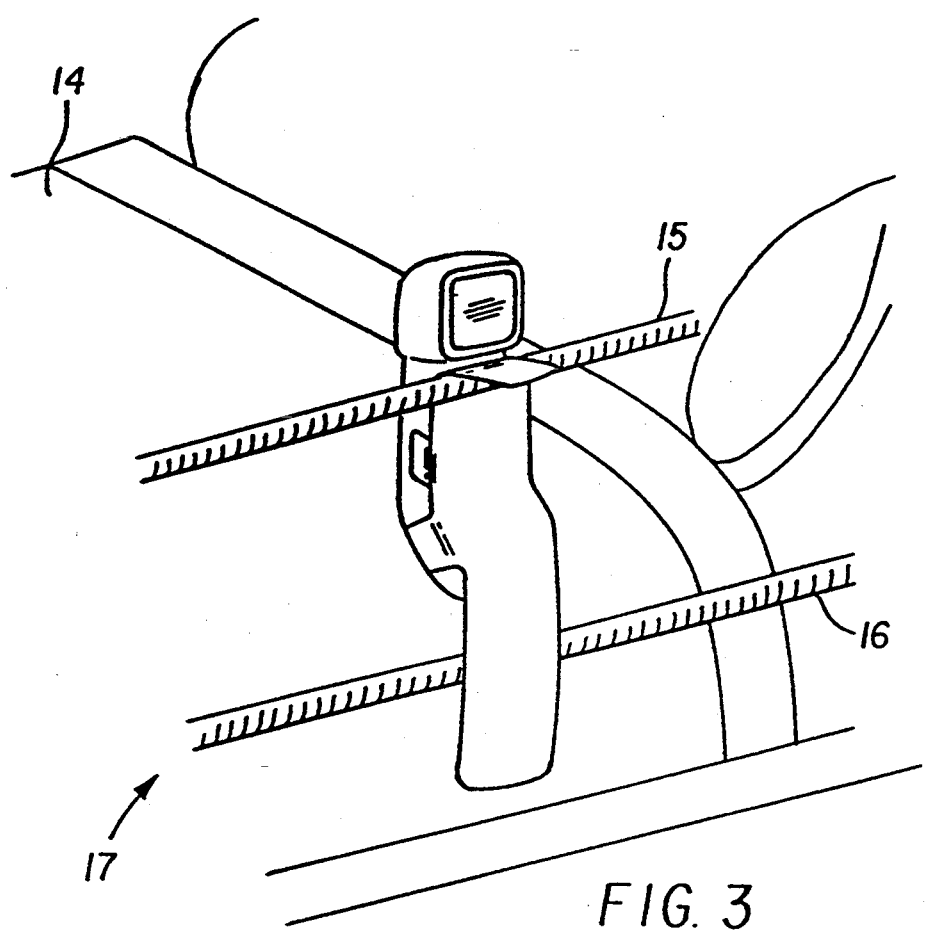
FIG. 3 shows the one-piece telephone/support assembly of FIG. 2 attached to a bed-rail assembly of a hospital bed.
Figure 5:
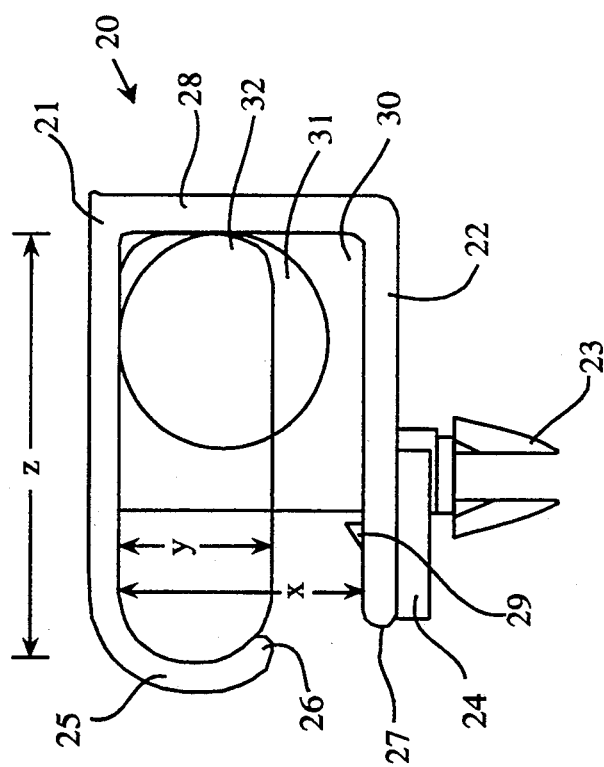
FIGS. 4 and 5 show front and side views of the present universal bed-rail clip, respectively.
Figure 4:
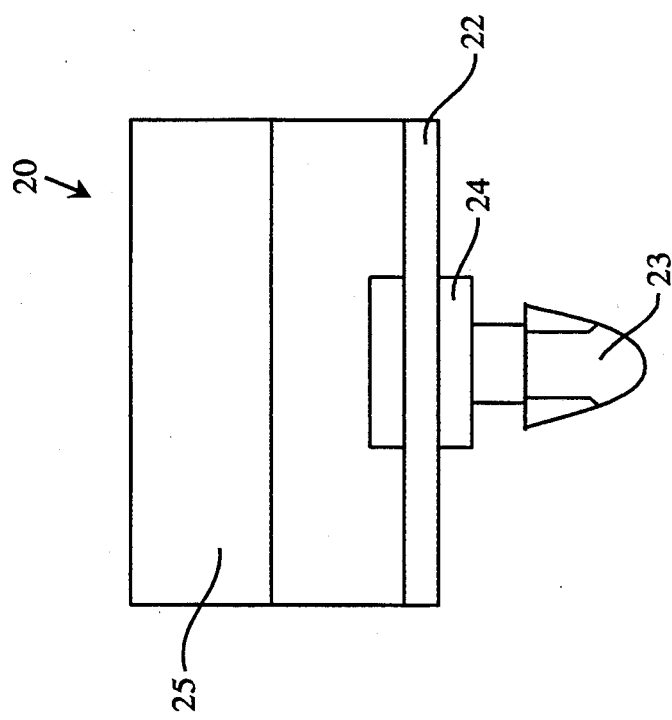

Referring to FIGS. 4–8, universal bed-rail clip 20 is shown having top and bottom sides 21 and 22, respectively, which are joined by joining side 28. As shown in FIG. 5, the clip is substantially U-shaped in cross-section. Top side 21 includes arc-shaped portion 25 terminating at external edge 26. The bottom side 22 terminates at external edge 27 and may include stop ridge 29. Elements 30, 31 and 32 correspond to Simmons, Jorens and Hilrom bed-rails, respectively, which are all widely used bed-rails for hospital beds. Advantageously, the inner contour of arc-shaped portion 25 complements the outer contour of Hilrom bed-rail 32.

Since, on beds having Hilrom bed-rails, the bed-rails elevate along with the elevation of the bed, the snug fit provided by the arc-shaped portion 25 keeps the entire assembly from sliding downward on the bed rail.

Distance X corresponds to a distance between the interior surfaces of the top and bottom sides, and is within a range of about 0.75 to about 1.0 inches, preferably 0.875 inches, such that Simmons bed-rail 30 may be accommodated within the internal volume of the clip. Distance Y corresponds to the height of Hilrom bed-rail 32, which is about 0.5 inches. Distance Z corresponds to a distance that the top side extends rearwardly, about 1.0 to about 1.5 inches (preferably 1.5 inches), corresponding to the width of Hilrom bed-rail 32. Radially expanding pin 23 extends downwardly from the bottom surface of bottom side 22 for engagement in a complementary hole in the one-piece telephone or supporting bracket therefor, such as hole 43 shown in FIG. 8.

Protrusion 24 is intended for engagement in a complementary shaped recess such as recess 42 (FIG. 8) of the one-piece telephone, or recess 35 in the supporting bracket to prevent rotation between clip 20 and supporting bracket 1 or one-piece telephone 10.

Figure 6:
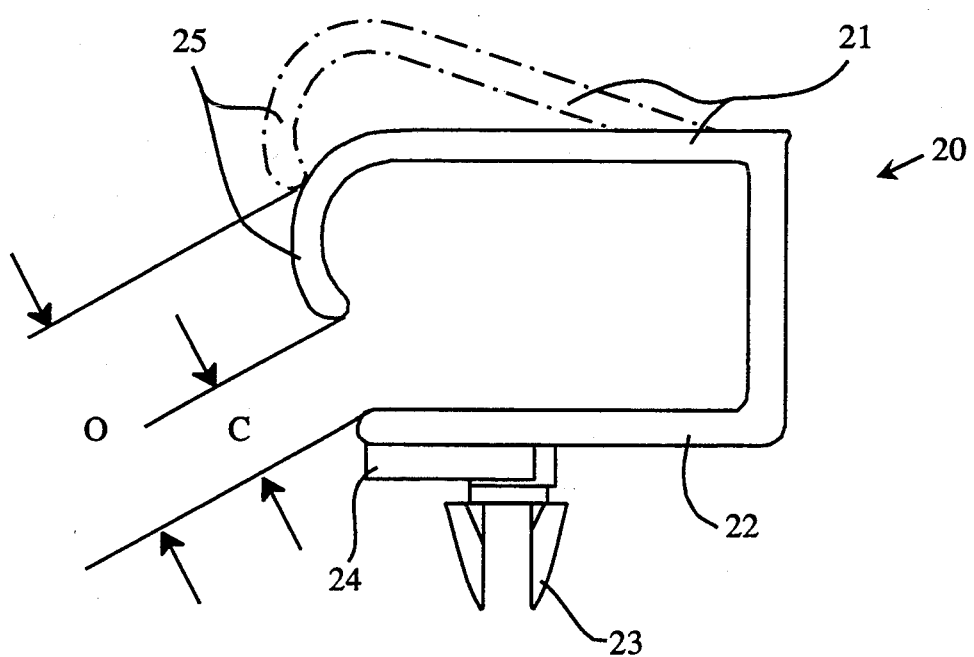
FIG. 6 illustrates open and closed positions of the present universal bed-rail clip.

Open and closed positions of the universal bed-rail clip are shown in FIG. 6. Top side 21 is flexible between open position O (about 0.875 inches) and closed position C (about 0.5 inches).

Figure 7:
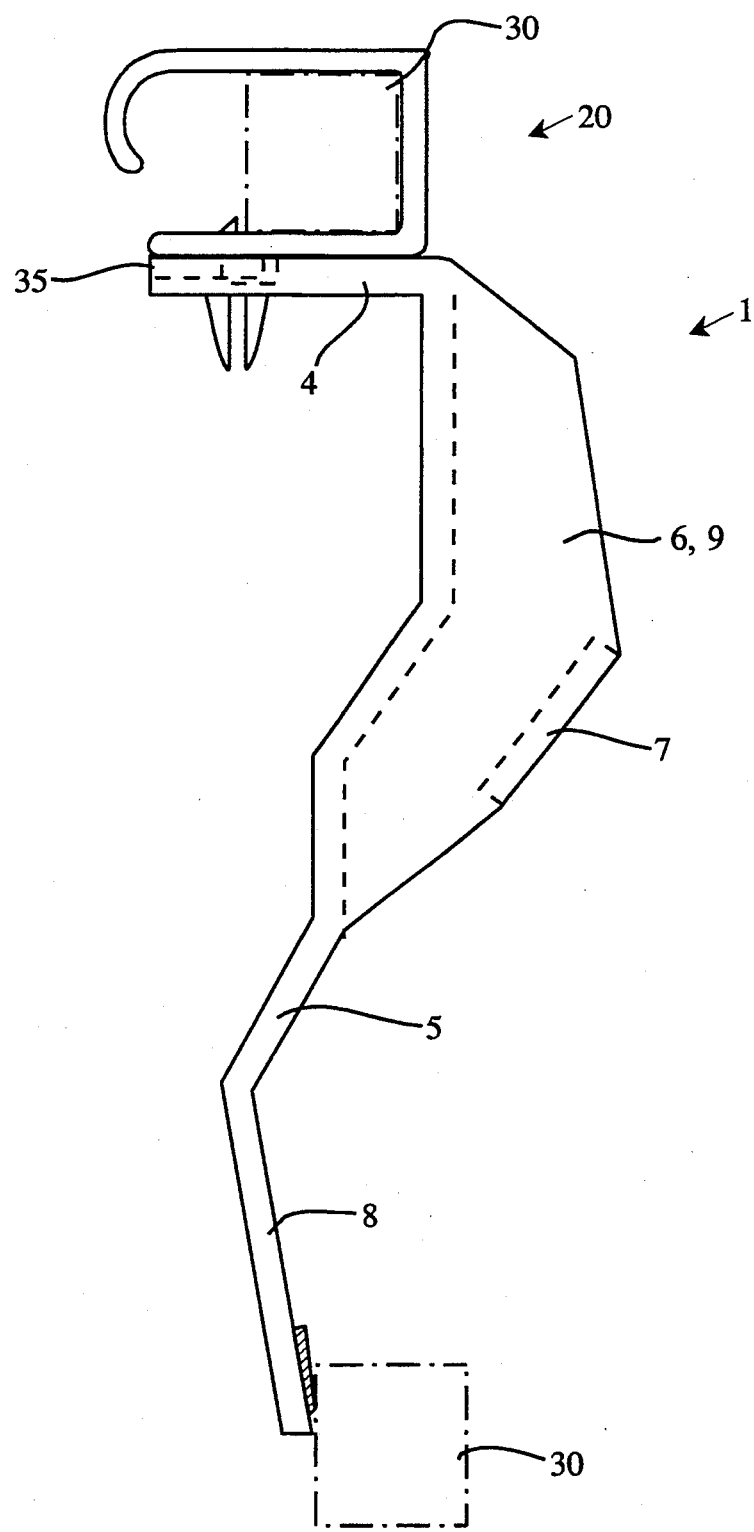
FIG. 7 illustrates a side view of the telephone support assembly of the present invention.

FIG. 7 shows the second aspect of the present invention, a telephone support assembly, including supporting bracket 1 and clip 20. According to the second aspect of the present invention, the telephone support assembly remains attached to the bed-rail assembly while the one-piece telephone is removed therefrom by the patient. Advantageously, VELCRO or magnetic tape or the like may be provided on longitudinal extension 8 of the supporting bracket 1.

Figure 8:
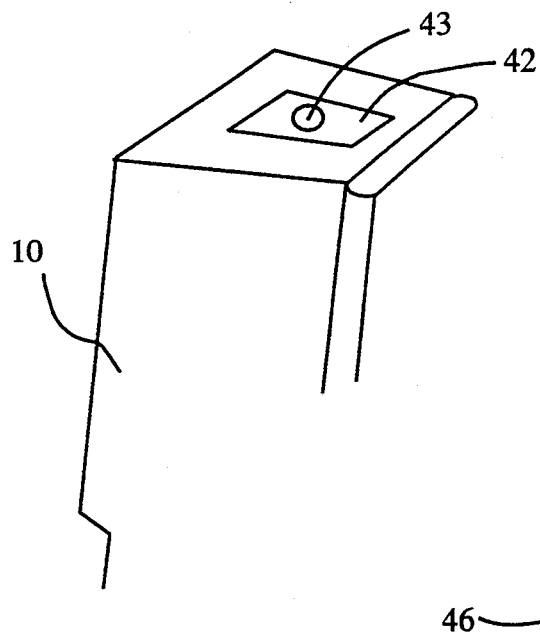
FIG. 8 illustrates a one-piece telephone of the present invention for use in combination with the universal bed-rail clip.
Figure 9:
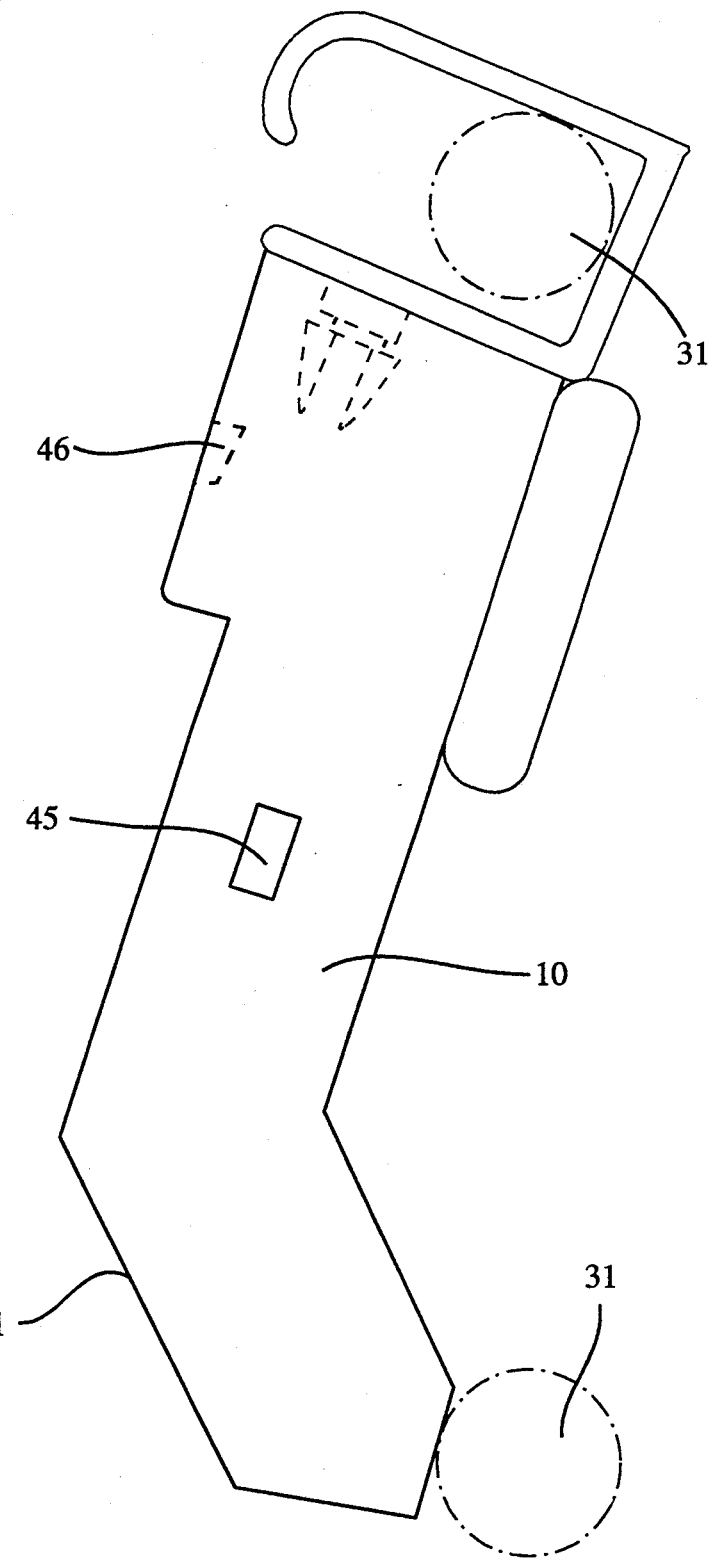
FIG. 9 illustrates a first side view of the telephone clip assembly of the present invention.

FIGS. 8 and 9 are directed to the third aspect of the present invention, a telephone clip assembly. One-piece telephone 10 includes angular extension 11 at a bottom end thereof (i.e., at the vicinity of the telephone receiver). Receiving hole 43 extending through the top surface of the phone provides engagement for radially expanding pin 23. Complementary recess 42 receives protrusion 24 of the clip to prevent rotation between clip 20 and one-piece telephone 10. A particularly important feature of the third aspect of the present invention is the angled extension 41. As shown in FIG. 9, the angled extension abuts the lower of Jorens bed rails 31, while shifting the one-piece telephone 40 rearward. In this manner, a bracing effect is established, thereby preventing rotation of the assembly about top rail of Jorens bed-rails 31. The angled extension of the one-piece telephone directly abuts a lower portion of a second bed-rail to "hang-up" the telephone, and the telephone clip assembly may be removed by the patient as one-piece from the bed-rail assembly.

Figure 10:
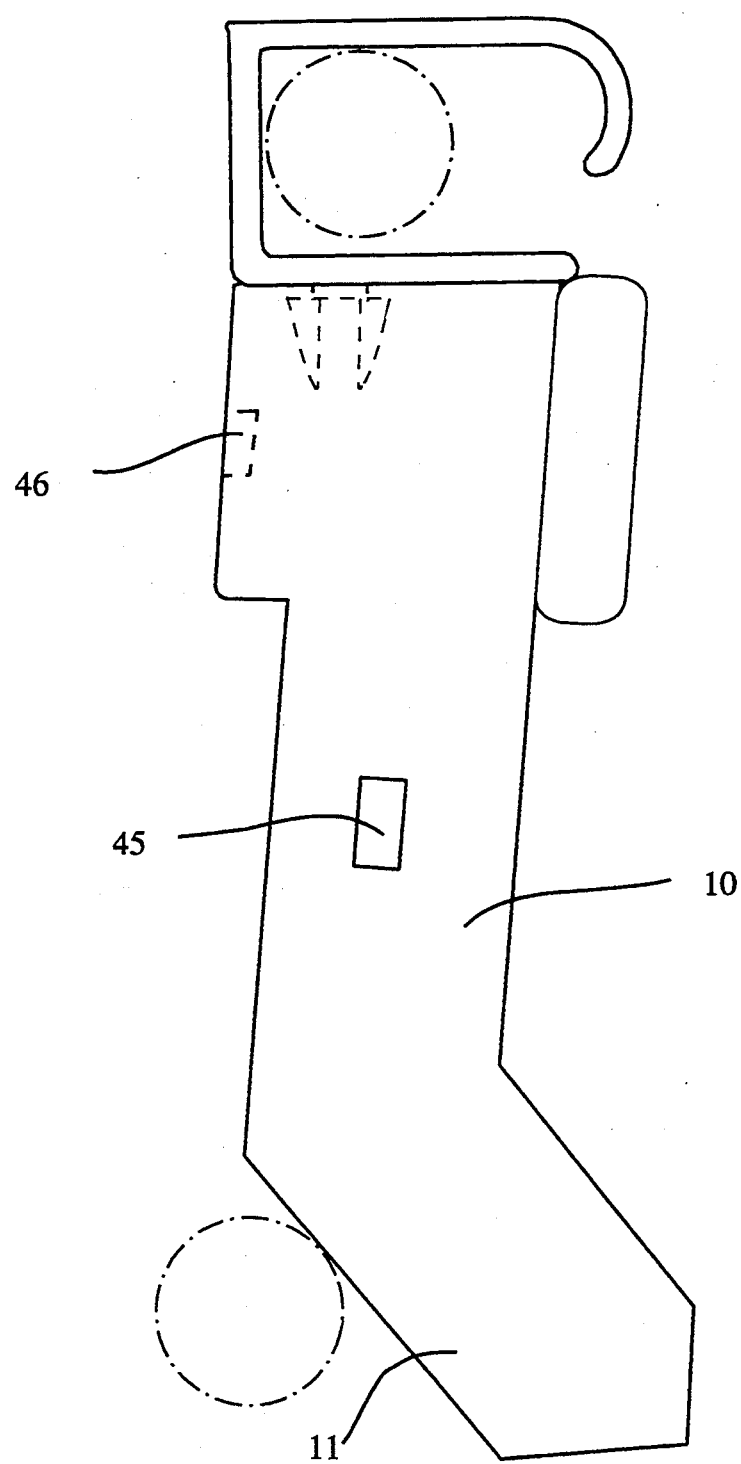
FIG. 10 shows a second side view of the telephone clip assembly of the present invention.

Alternatively, the telephone clip assembly may be attached to a bed-rail assembly as shown in FIG. 10. Since the angled extension does not directly abut the lower rail, it is particularly desirable to have manual hang-up switch 45 cooperable with pilot light 46.

It has been found that the third aspect of the present invention, directed to a telephone clip assembly is particularly desirable and unexpected. That is, while solving a deficiency with the prior disclosed telephone support bracket, it has been discovered that the universal bed-rail clip of the present invention may be used directly with the one-piece telephone, without the supporting bracket. Accordingly, cost of manufacture is reduced, while improving the sanitary characteristics of previously known telephone supporting devices by utilizing less material and fewer parts. Moreover, the overall bulk of the telephone and supporting means is reduced.

It should also be noted that the preferred embodiments discussed above include a radially expanding pin for insertion into a complementary hole in the one-piece telephone or supporting bracket. Such attachment means provides a permanent join between the clip and the one-piece telephone or supporting bracket, but a semi-permanent joining means may also be employed, as long as a rigid connection is maintained. Alternatively, the universal bed-rail clip may be co-molded with the supporting bracket or telephone as one-piece.

The present universal bed-rail clip can be made of any suitable material, preferably plastic. Forming methods may include injection molding, heat molding, or vacuum forming, as readily known to the artisan.

It can thus be seen that the present invention provides a novel device which conveniently and economically provides telephone communication to bedridden hospital patients, which is easy and economical to manufacture, while overcoming the disadvantages of prior devices.

It is understood that those skilled in the art of bed mounted devices may suitably alter the embodiments described herein without departing from the scope of the appended claims.

What is claimed is:

1. A telephone clip assembly for clipping onto an upper horizontal rail of a bed-rail assembly of a hospital bed, the bed-rail assembly including said upper horizontal rail and a lower horizontal rail, comprising:

a one-piece telephone comprising a telephone body having a front surface presenting a speaker means, a back surface opposite said front surface, and a top surface joining said front and back surfaces to each other, said telephone body having a generally elongated shape;

abutment means for abutting against the lower horizontal rail of the bed-rail assembly, said abutment means comprising a bottom portion of the telephone body; and universal mounting means for mounting the one-piece telephone to various types of bed-rail assemblies, said universal mounting means comprising a universal bed-rail clip affixed to said top surface of the one-piece telephone for clipping said one-piece telephone onto the upper horizontal rail of the bed-rail assembly, said universal bed-rail clip comprising top and bottom sides being joined together by a joining side and defining, opposite said joining side, an opening for receiving said upper horizontal rail, said universal bed-rail clip being substantially U-shaped in cross-section, wherein a distance between internal surfaces of said top and bottom sides is about 0.75 to about 1.0 inches, said top side extends about 1.0 to about 1.5 inches from said joining side, at least one of said top and bottom sides is flexible between open and closed positions, and said open position permits passage of said upper horizontal rail through said opening into an interior of said universal bed-rail clip.

2. The device of claim 1, further comprising anti-rotation means for preventing said universal bed-rail clip from rotating relative to said one-piece telephone.

3. The device of claim 2, wherein said anti-rotation means comprises a protrusion extending from a bottom surface of said bottom side, and a recess of complementary shape formed in said top surface of said one-piece telephone.

4. The device of claim 1, wherein the universal bed-rail clip further comprises fixation means for attaching the universal bed-rail clip to said one-piece telephone.

5. The device of claim 4, wherein said fixation means comprises a radially expanding pin extending downwardly from a bottom surface of the bottom side of the universal bed-rail clip for engagement in a complementary hole in said top surface of said one-piece telephone.

6. The device of claim 1, wherein the one-piece telephone and the universal bed-rail clip form a single, unitary piece.

7. The device of claim 1, wherein external edges of said top and bottom sides are spaced apart a distance of about 0.5 inches in said closed position.

8. The device of claim 1, wherein external edges of said top and bottom sides are spaced apart a distance of about 0.875 inches in said open position.

9. The device of claim 1, wherein said top side comprises a rearwardly and downwardly extending arc-shaped portion terminating in an external edge which partially bounds said opening.

10. The device of claim 1, further comprising a stop ridge disposed along an internal bottom surface of said bottom side.

11. The device of claim 1, wherein said bottom portion of said telephone comprises an angular extension.

* * * * *